(12) United States Patent　(10) Patent No.: US 6,730,224 B2
Blackburn　(45) Date of Patent: May 4, 2004

(54) ADVANCED AEROBIC THERMOPHILIC METHODS AND SYSTEMS FOR TREATING ORGANIC MATERIALS

(75) Inventor: James W. Blackburn, Carbondale, IL (US)

(73) Assignee: Board of Trustees of Southern Illinois University, Carbondale, IL (US)

(*) Notice: Subject to any disclaimer, the term of this patent is extended or adjusted under 35 U.S.C. 154(b) by 0 days.

(21) Appl. No.: 09/895,008

(22) Filed: Jun. 28, 2001

(65) Prior Publication Data

US 2002/0108904 A1 Aug. 15, 2002

Related U.S. Application Data

(60) Provisional application No. 60/215,086, filed on Jun. 29, 2000.

(51) Int. Cl.[7] .................................................. C02F 3/02
(52) U.S. Cl. .................. 210/604; 210/612; 210/181; 210/218; 210/220; 210/903
(58) Field of Search ................................ 210/603, 604, 210/612, 620, 621, 747, 170, 175, 177, 181, 194, 205, 218, 220, 221.1, 221.2, 903, 908

(56) References Cited

U.S. PATENT DOCUMENTS

| | | | | |
|---|---|---|---|---|
| 3,219,575 A | * | 11/1965 | Chapman et al. | 210/612 |
| 3,800,865 A | * | 4/1974 | Onarheim et al. | 165/92 |
| 3,926,794 A | * | 12/1975 | Vahldieck | 210/604 |
| 4,040,810 A | * | 8/1977 | Eby et al. | 71/9 |
| 4,198,211 A | * | 4/1980 | Shattock | 48/197 A |
| 4,372,856 A | * | 2/1983 | Morrison | 210/603 |
| 4,493,770 A | * | 1/1985 | Moilliet | 210/603 |
| 4,660,628 A | * | 4/1987 | Solberg et al. | 165/92 |
| 4,975,194 A | * | 12/1990 | Fuchs et al. | 210/604 |
| 5,145,581 A | * | 9/1992 | Novy et al. | 210/609 |
| 5,302,179 A | * | 4/1994 | Wagner | 71/13 |
| 5,587,081 A | * | 12/1996 | Norcross et al. | 210/604 |
| 6,036,862 A | * | 3/2000 | Stover | 210/603 |

* cited by examiner

Primary Examiner—Fred G. Prince
(74) Attorney, Agent, or Firm—Harness, Dickey & Pierce, P.L.C.

(57) ABSTRACT

An improved method for the aerobic thermophilic treatment of organic material of the type in which air is passed through organic matter contained in a reactor, in which at least a portion of the air that has passed through the organic matter in the reactor being captured and again passed through the organic matter.

2 Claims, 10 Drawing Sheets

US 6,730,224 B2

ADVANCED AEROBIC THERMOPHILIC METHODS AND SYSTEMS FOR TREATING ORGANIC MATERIALS

CROSS REFERENCE TO RELATED APPLICATION

This application claims priority of prior U.S. provisional patent application Ser. No. 60/215,086, filed Jun. 29, 2000, and incorporated herein in its entirety.

BACKGROUND OF THE INVENTION

This invention relates to methods and systems for treating livestock wastes and other organic materials, and in particular to an improved aerobic thermophilic methods and systems for treating such materials.

There are numerous ways of treating livestock waste and other organic materials to break these materials down into less objectionable, useful products. One relatively inexpensive way is to flush the waste into lagoons where the waste can be broken down by bacteria and stored until final use (typically application to the soil to increase crop production). There are two basic types of lagoons, anaerobic and aerobic. In anaerobic lagoons, anaerobic bacteria (i.e., bacteria that do not need oxygen) break down the wastes. Anaerobic lagoons are the most common, because they are simple to construct and operate. However, while modern design techniques and proper management control minimize most problems, anaerobic lagoons can be the source of objectionable odors. In aerobic lagoons, aerobic bacteria (i.e., bacteria that need oxygen) break down the wastes. These lagoons need either a very large surface area or mechanical aeration to provide adequate oxygen for the bacteria. For this reason, aerobic lagoons are less common, even though they are less likely to be the source of objectionable odors.

More recently, aerobic thermophilic treatment (also referred to as A-T treatment) has been applied to livestock wastes. A-T treatment uses aerobic biological oxidation at thermophilic (high) temperatures (approximately 55° C.) to achieve high pollutant reductions in a relatively short time. A-T treatment requires relatively little capital investment and achieves faster processing times and reduced odor production.

SUMMARY OF THE INVENTION

The methods and apparatus of the present invention relate to improvements in A-T treatment of livestock wastes and other organic materials. A-T treatment typically involves passing air through a reactor containing the waste or other organic material. Oxygen from the air is absorbed by the material in the reactor, promoting the microbial breakdown of the material in the reactor. According to the improvements of the present invention, at least a portion of the air that has passed through the organic matter in the reactor is captured and recycled through the organic material in the reactor. The inventor has discovered that a major loss of heat in A-T treatment systems is due to the evaporation of water into the air passing through the material in the reactor. However, once the air has passed through the material, it has been heated and humidified and retains as much as 85% of the available oxygen. Thus by recycling at least some of the air, and reducing fresh air, heat loss due to evaporation can be reduced, yet sufficient oxygen remains in the air for oxygenating the material in the reactor. The resulting process and system produce excess heat that can be productively used for heating buildings, etc.

In accordance with a first alternative embodiment of this invention, the reactor is substantially enclosed, and ammonia is removed from the air that has passed through the organic matter before that air is released to the atmosphere. Escaping ammonia in prior treatment systems is responsible for some of the odor associated with waste treatment, and results in significant loss of nitrogen.

In accordance with a second alternative embodiment of this invention, ammonia is removed from the air before it is again passed through the organic matter. The removal of ammonia not only reduces odors resulting from operation and reduces loss of nitrogen, but also helps promote the aerobic bacteria in the reactor so that the reduction of the waste is faster, more efficient, and more complete.

DETAILED DESCRIPTION OF THE INVENTION

Figure 1:
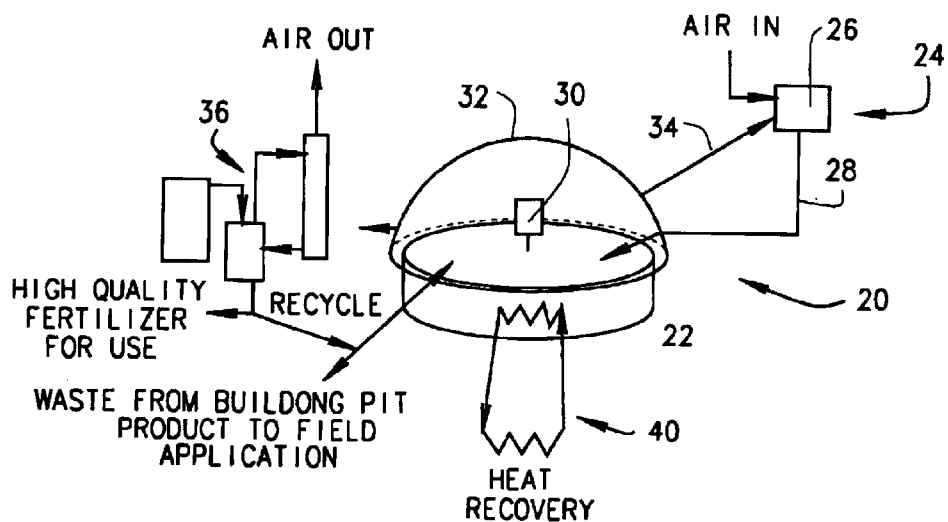
FIG. 1 is a schematic diagram of an A-T Treatment System constructed according to the principles of this invention.
Figure 6:
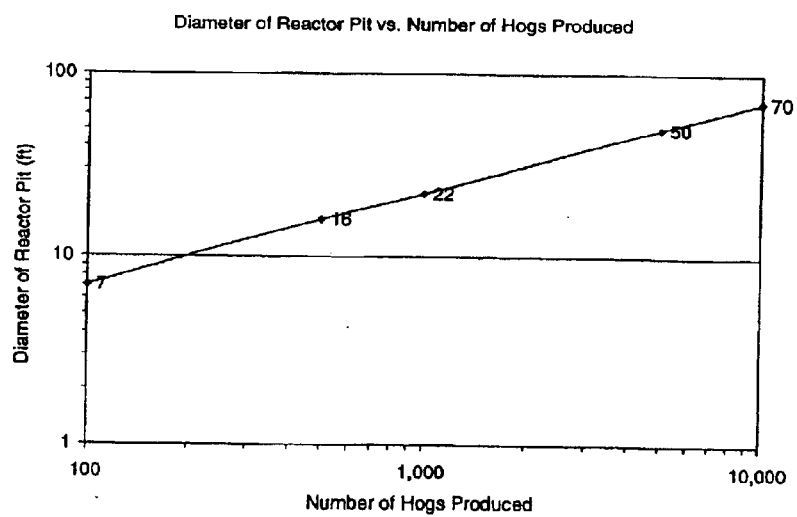
FIG. 6 is a graph of reactor size (diameter) versus number of hogs whose waste can be treated in the reactor.

An improved A-T system constructed according to the principles of this invention is indicated generally as 20 in FIG. 1. As shown in FIG. 1, the system 20 comprises a relatively small, lined, in-ground reactor pit 22 where the treatment of the livestock waste or other organic material takes place. Alternatively, instead of a reactor pit 22, the reaction can be conducted in a tank. As shown and described herein, the system 20 is adapted for the treatment of livestock waste, and in particular hog waste, but the invention is not so limited, and can be applied to the treatment of any organic waste or other organic material. FIG. 6 shows the size of the lined, in-ground reactor pit 22 for various farm sizes. These diameters are much smaller than the required lagoon sizes needed for existing treatment processes.

The system 20 comprises an air circulation system 24 for passing air through the waste in the reactor pit 26. The air circulation system 24 comprises a blower 26 and conduit 28 for bringing air to the reactor pit 22. An oxygen transfer mixer 30 may also be provided in the reactor pit 22 to facilitate the oxygenation of the waste in the reactor pit.

In accordance with the principles of this invention, the system 20 further comprises a lightweight cover 32 for covering the reactor pit 22, substantially capturing the air that is passed through the waste in the reactor pit, as well as any by-product gases generated. The system includes a recycling system 34 for recycling air that has passed through the material in the reactor. This air has absorbed moisture and heat from the material in the reactor, therefore will remove less energy from the waste than would fresh air passed through the material in the reactor. Moreover, after one pass the air still retains as much as 85% to 90% of its original oxygen content, so that it can still provide oxygenation to the aerobic bacteria in the material.

In accordance with a first alternate embodiment of this invention shown in FIG. 1, an ammonia recovery scrubber 36 can be provided to remove ammonia from air in the system before the air is released to the atmosphere. This serves at least two important functions: First, it helps controls odors emitted from the system, and second it helps reduce nitrogen loss. The recovered ammonia can be used in high quality fertilizer product either separately, or it can added back to the treated material removed from the reactor pit.

Figure 2:
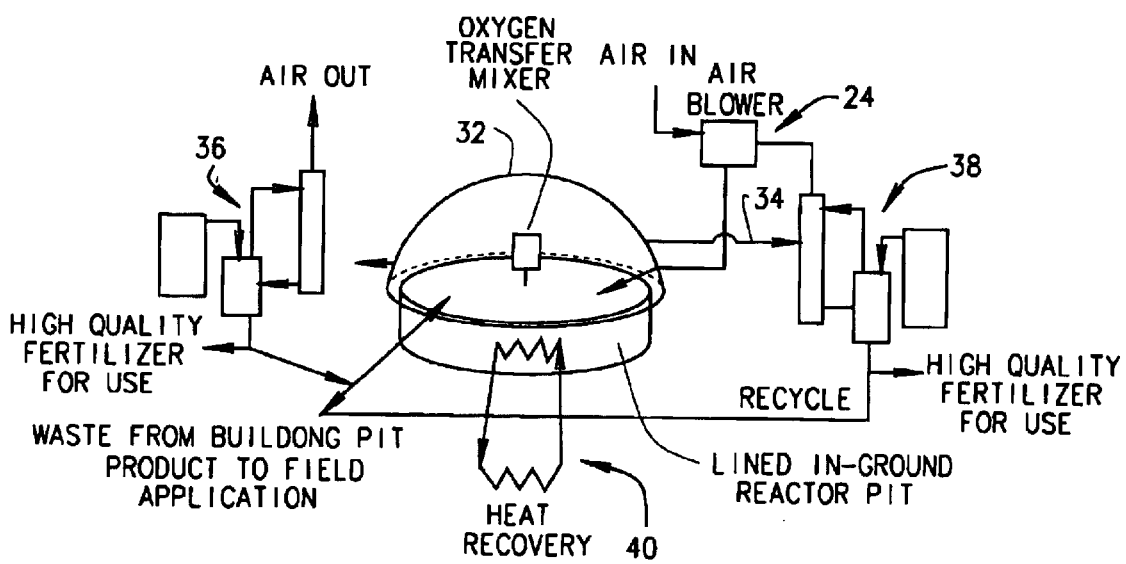
FIG. 2 is a schematic diagram of an alternative A-T Treatment System constructed according to the principles of this invention.

In accordance with a second alternate embodiment of this invention shown in FIG. 2, an ammonia recovery scrubber 38 can be provided in the air recycle system to remove ammonia before the air is recycled. This helps prevent ammonia from building up in the reactor pit 22 to levels that could impair the action of the bacteria in the reactor pit.

Finally, the system 20, includes a heat recovery system 40, including for example, a heat exchange and associated piping for removing heat during the A-T reaction.

According to the method of this invention, the reactor pit is initially loaded with a certain amount of hog waste from production building storage. Air is added by the system 24, which recycles some air from the reactor pit 22. The mixer 30 is needed to help maximize the oxygen transfer and to keep solids suspended—both of which are important to the economic success of the system. The air that is not recycled is passed through the ammonia scrubber system 36 to recover ammonia for use as a high-grade fertilizer. The recovered ammonia may be either saved for special use or sale, or mixed into the treated waste to restore its nitrogen level. Clean, odorless air is emitted from the scrubber to the atmosphere. As shown in FIG. 2, an ammonia scrubber system 38 can also be used to remove ammonia from the recycled air.

Initially, heat generated by the system is used to increase the operating temperature of the reactor to around 55° C., thereafter heat is removed by heat recovery system 40 for use, for example in building heating or aquaculture. After about 6 days operation, the air blower 26 is turned off and the product is pumped out for use for field application.

The method and system appear to provide a number of advantages over other waste treatment methods, including prior A-T treatment methods.

The A-T treatment system of the present invention appears to result in lower odor emissions than with prior systems. Empirical qualitative observations from test runs indicate that objectionable odors diminished rapidly in less than one day in the system, to a level where a low-level odor suggestive of grain was left. It was noted that when the waste pH concentration increased to higher levels, an ammonia odor was present. Further findings indicate that the equivalent of about 50% of the initial ammonia measured in the waste strips out into the air passing through the reactor. While this may be acceptable from an odor standpoint, it represents a loss of about 28% of the nitrogen value of the waste. Tests confirm that virtually no nitrification occurs in this system. In the preferred embodiment, an acid air scrubber 36 is included to recover this ammonia from an economic point of view and the odors arising from this covered system and scrubbed air stream would be very, very low. This system succeeds in significant odor removal estimated to exceed 90%.

The volume of treated product generally corresponds to the volume of raw material charged to the system, and generally it would be expected to be significantly less than waste treated in anaerobic lagoons since there would be no dilution from rain water as seen in existing treatment. This also assumes that the treated waste is applied to the fields once each week, because if the treated waste is stored for longer periods, dilution from rainfall in the storage system is likely and the volumes would increase. There is considerable variability in swine waste and the way it behaves in the system but soldids reductions of 30% are routinely obtained, and solids reductions of 70% or more have been attained.

Figure 3:
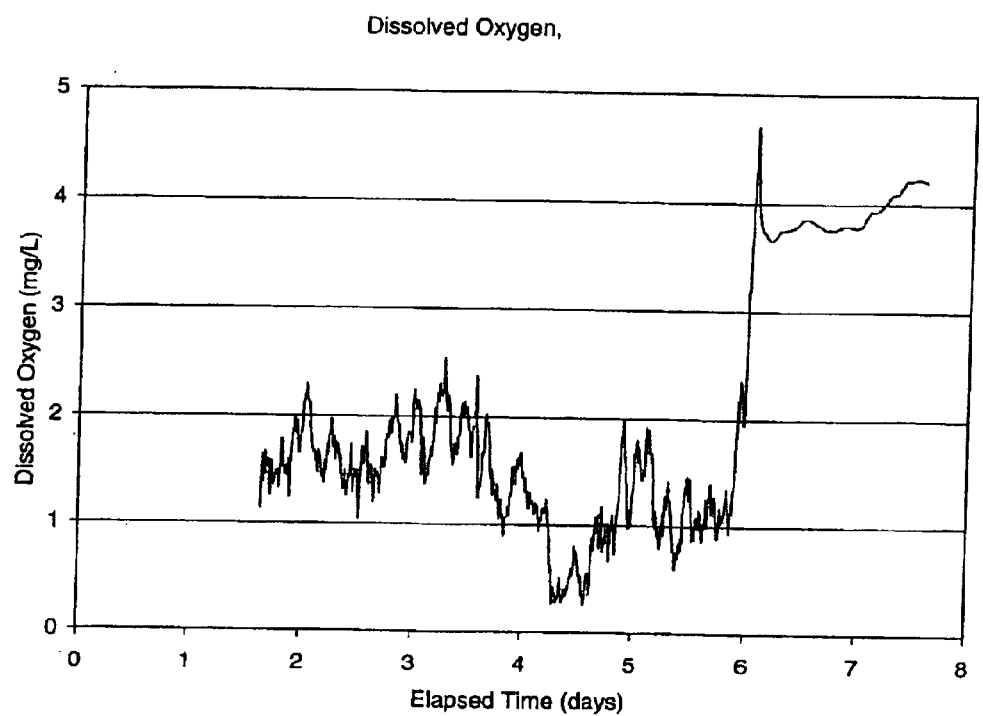
FIG. 3 is a graph of dissolved oxygen in the material versus time, for test run B.
Figure 4:
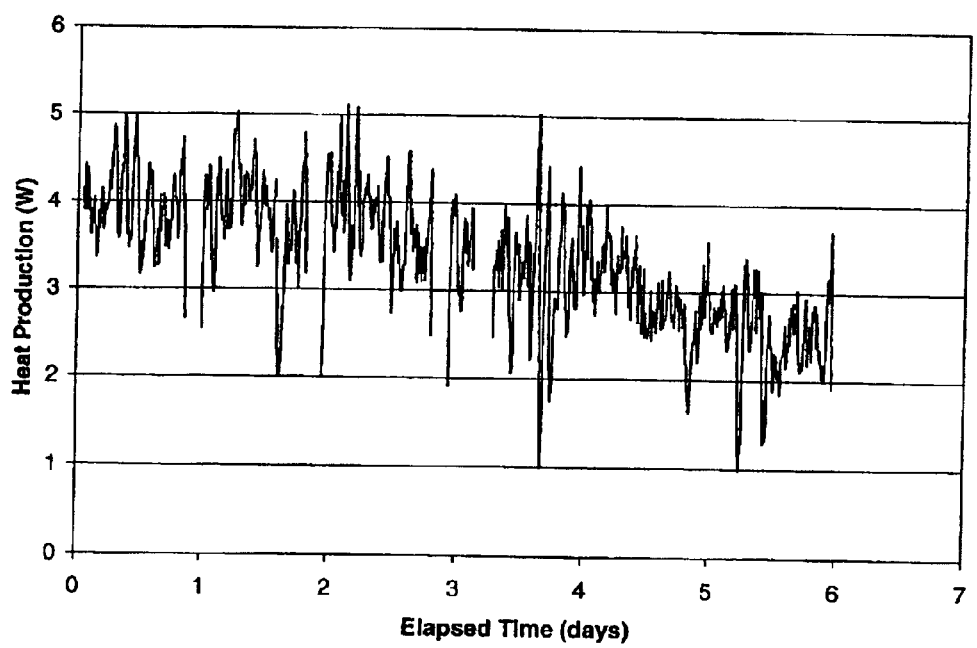
FIG. 4 is a graph of heat production (N) from the A-T treatment process versus time, for test run B.

Regarding energy production, FIG. 4 is a graph of heat production versus time for an experimental run. FIG. 4 illustrates that heat production begins almost immediately and declines at a slow rate during the run. Air feed flow and related oxygen transfer are critical to the efficiency and economics of the system. Table 1 compares the results of two experimental runs, and illustrate the importance of airflow and related oxygen transfer in the system. In Run B, airflow was increased to 144% of the run A, which resulted in a 325% increase in heat production rate. FIG. 3 shows the dissolved oxygen concentrations in the biocalorimeter for most of Run B. The system was purposely made alkaline at day 6 to kill the biomass and stop oxygen uptake.

TABLE 1

Experimental Operating Data for Two Runs

| RUN | Initial Total Solids (wt %) | Percent Solids Removal | Residence Time (Days) | Temperature (° C.) | Air Flow (mL/min) | Heat Production By Energy Balance (W/g ini. solids) | Heat Production By Analysis (W/g ini. solids |
|-----|---|---|---|---|---|---|---|
| A | 6.7 | 47 | 11 | 55 | 590 | * | 0.008 |
| B | 8.6 | 70 | 6  | 55 | 850 | 0.028 | 0.026 |

* Not reliable because of experimental difficulties.

Waste concentration may have an effect on the oxygen transfer rate. Concentrations similar to the raw waste (i.e., about 15% total solids), are more viscous and may have a lower oxygen transfer rate at the operating conditions. However, it is possible to design a system to run at lower concentrations without the continuous addition of dilution water, so operation at these concentrations is feasible.

The treated waste from the A-T treatment is a superior fertilizer in several ways as compared to current anaerobic lagoon treatment. As stated above, the solids concentrations in the treated waste is much lower than in the untreated waste, which makes the application of the treated waste easier. The treated waste contains much higher levels of nitrogen because the nitrogen is preserved in the product, and ammonia otherwise lost to the atmosphere is recovered. In comparison, anaerobic lagoons can loose up to 80% of their nitrogen. The nitrogen in the treated waste is ammonia and likely complex organic nitrogen. Only trace levels of nitrates/nitrites are present, reducing nitrogen application loss and pollution potential. The organic nitrogen acts as a "slow-release" fertilizer on application and reduces environmental losses.

Figure 5:
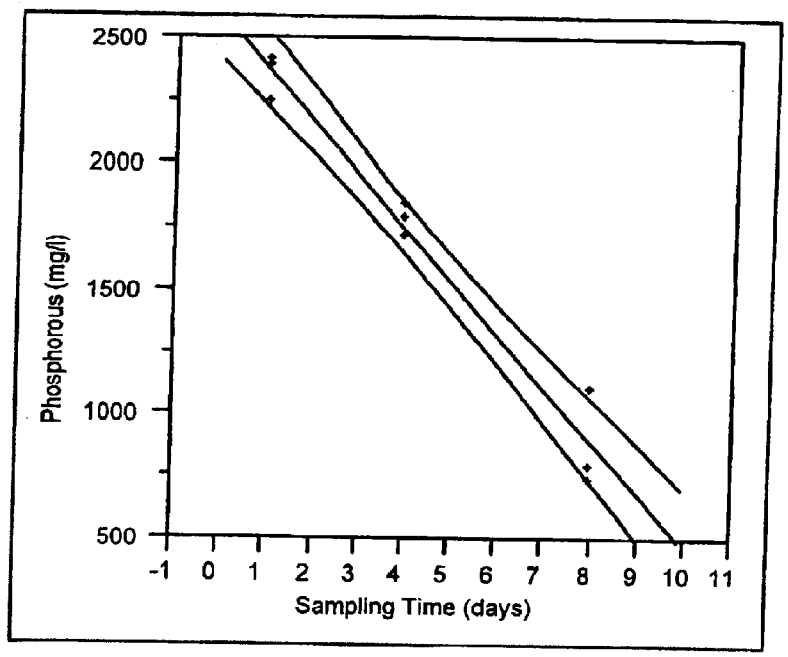
FIG. 5 is a graph of phosphorous content of the material (mg/1) versus time, for test run B.

Phosphorus tends to build up to problem levels in the soils to which treated waste from anaerobic lagoons is applied. Surprisingly, initial data indicates that phosphorus (as measured by total phosphorus from hot acidic per sulfate digestion) is removed from the treated waste, further improving the nitrogen:phosphorus ratio of the treated waste. This is illustrated in FIG. 5 where, as a result of treatment, the N:P ratio is 5 to 15 as compared to 3 to 5 from lagoon-treated waste.

It further appears that the method and system of the present invention reduces pathogens in the product to less than 10% of the content in the original waste. Pathogen content may be a pollution issue for the livestock producers in the future.

Performance of the system 20 was evaluated using the results from runs A and B, discussed above. Cases were analyzed for a number of design choices to investigate and identify the important parameters for performance and economics. The base case for design assumes a 6 day residence time (treating 7 days of waste), an initial total solids concentration of 80 g/L, a per capita waste generation rate of 8.98 kg/day of total waste (from ASAE Standards, 1995), an average hog size of 65 kg, 5000 hogs, and an energy content of raw waste of 15,282 KJ/kg dry solids (as measured in this study). Other values for design parameters are also investigated.

Figure 7:
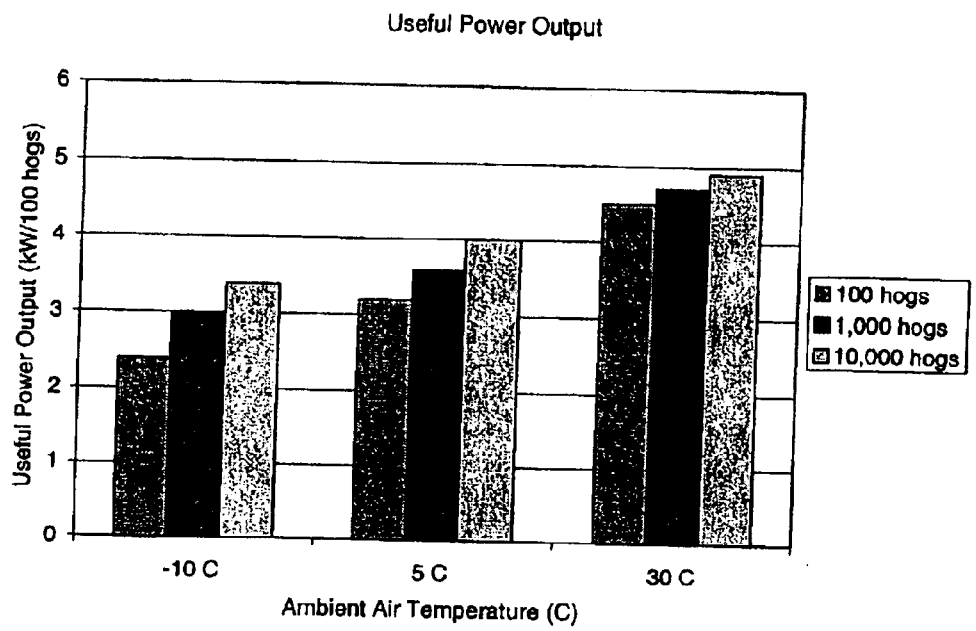
FIG. 7 is a chart of useful power output versus ambient air temperature for three different size systems.

The useful power output (per 100 hogs) as a function of farm size and ambient air temperature is shown in FIG. 7. It may be seen here that the power output at low ambient air temperatures is lower than at higher air temperatures. However, significant amounts of power are still produced when the air temperature is low and heat is needed.

Figure 8:
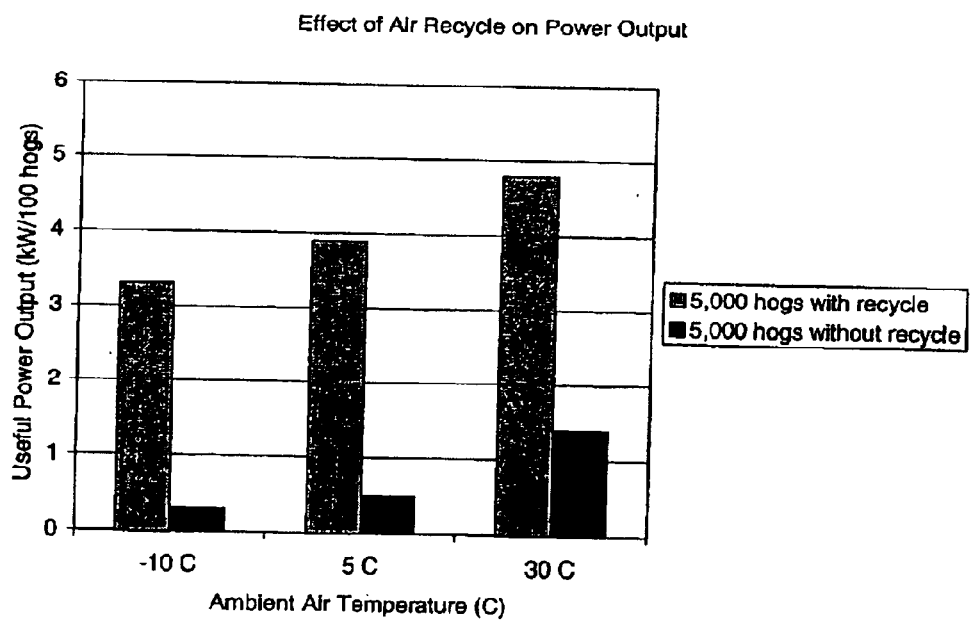
FIG. 8 is a chart comparing power output with the air recycle feature of the present invention, versus power output without air recycle at three different ambient temperatures.

A special part of this design is the recycle of air fed to the reactor pit 22. This is needed for energy efficiency and is critical for economical operation. FIG. 8 shows the useful power output per 100 hogs with and without air recycle. It is seen that the useful power without air recycle is very low and would not economically justify the system.

Calculations of capital cost and net income were made for the purposes of estimating the profitability of A-T in accordance with the treatment methods and systems of the present invention. (For purposes of these calculations electric power was assumed to cost $0.05/kWh, fuel oil was assumed to cost: $1/gal; sulfuric acid was assumed to cost: $45/ton; anhydrous ammonia was assumed to cost: $250/ton; and excavation/placement of soil was assumed to cost: $5/yd$^3$).

The value of a particular configuration was evaluated by calculation of a profitability parameter called payout, i.e. the net annual benefits of operation are divided by the estimated capital cost to give the number of years required to recover the initial investment. The net benefits for several cases can be calculated by estimating: 1) the useful power produced based on the equivalent cost of fuel oil and 2) the value of the additional nitrogen in the A-T product vs. that in anaerobic lagoon waste, minus 3) the cost of electrical power to drive the agitator, pumps, and blower and 4) the cost of sulfuric acid needed to recover the low levels of ammonia from the reactor off gas. The cost of operating labor was not included. Capital costs were estimated as "budgetary estimates" and do not include engineering or general contractor costs. These estimates were based on several published cost sources and were adjusted for construction price indices and installation costs. Capital cost estimates at this level are expected to be correct for these bases within ±30%.

Figure 9:
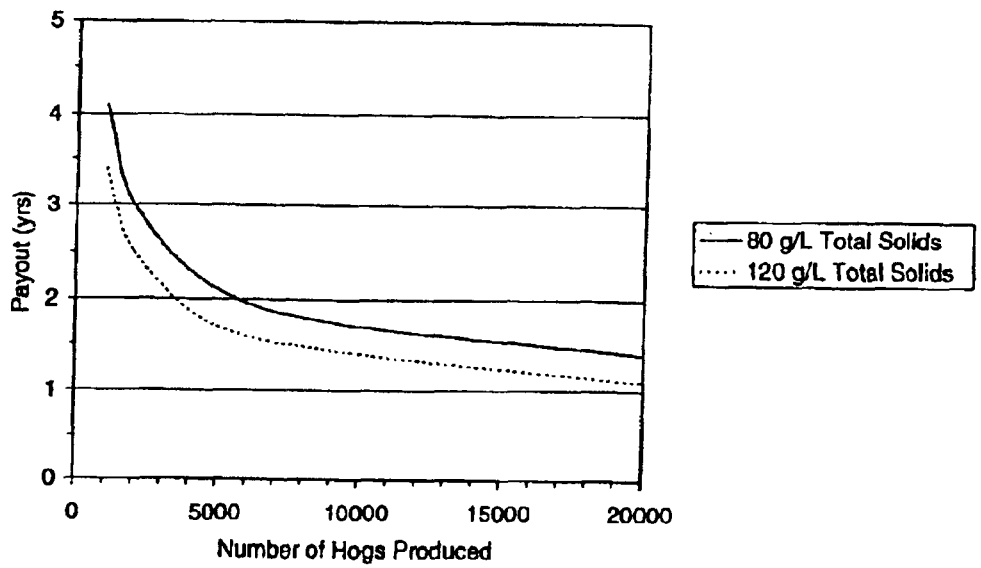
FIG. 9 is a graph of payout (in years) versus the number of hogs whose waste is treated, for two different solids contents.

The lower the payout number, the better is the economic investment. A payout of one year means that net annual income equals the initial investment. FIG. 9 shows the payout for the base case of 6-day residence time and an air temperature of 5° C. versus the number of hogs produced. Profitability ranges from near one year for very large farms (greater than 10,000 hogs) to over 3 years for small farms (1000 hogs or less). While effective for odor control, A-T Treatment is not very profitable for small farms of less than 1000 hogs.

Figure 10:
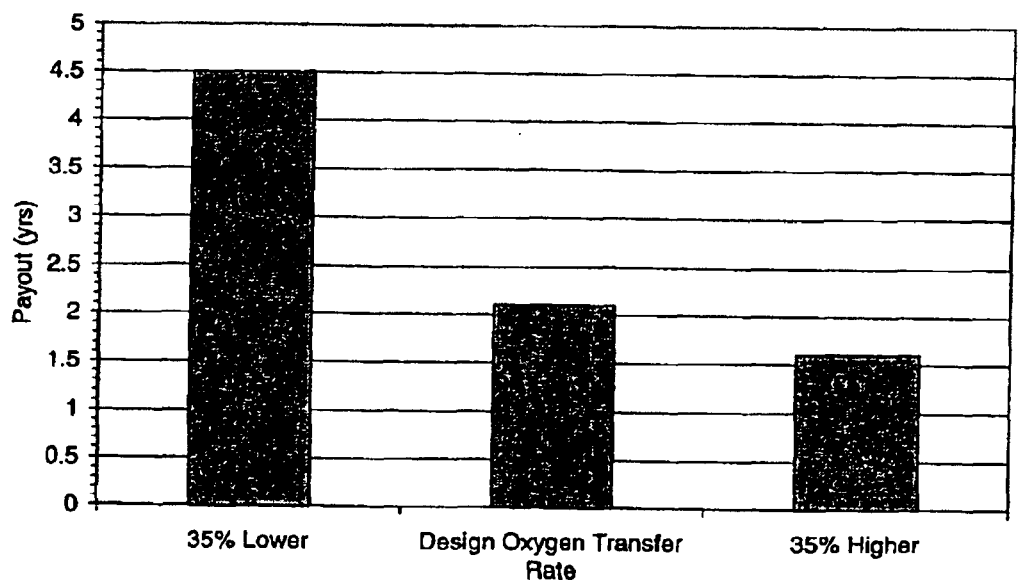
FIG. 10 is a bar graph showing the effect of oxygen transfer rate on payout (years)

Profitability can be used to identify sensitive design factors. For instance, as seen in FIG. 10, the amount of oxygen transferred in the A-T system is critical for profitability. This application is beyond the available references for aeration systems because of high concentration and temperature. However, the base case was based on observations from experiments run. While increases in oxygen transfer rates will not help profitability very much, unexpected lower oxygen transfer rates will greatly harm profitability.

Figure 11:
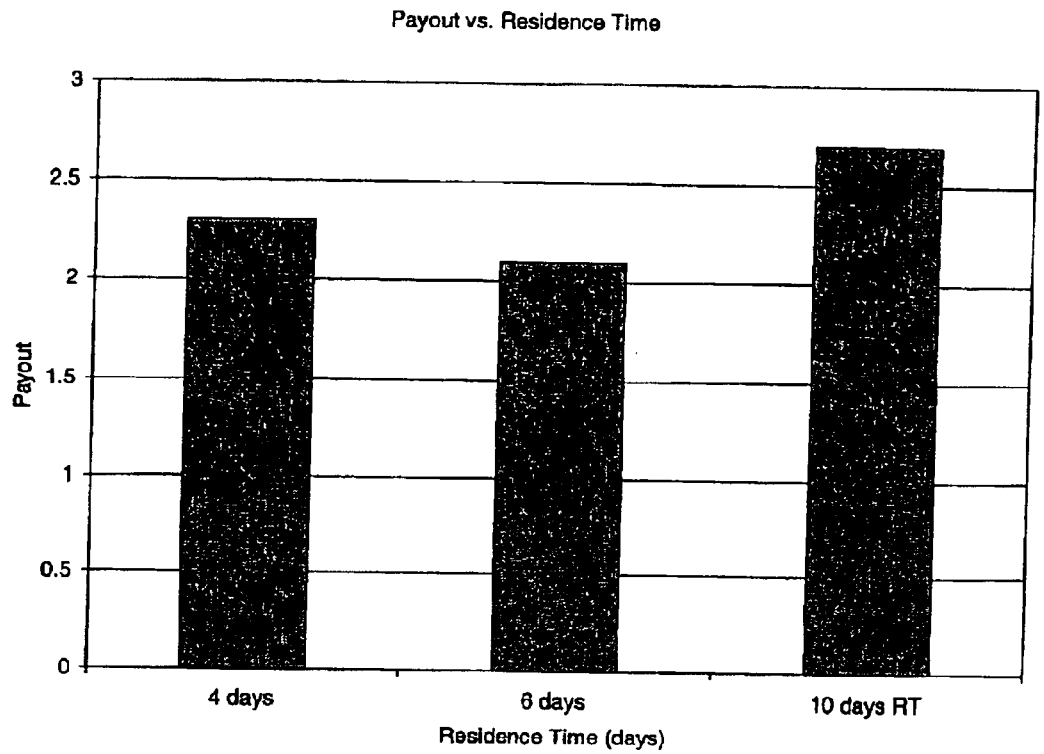
FIG. 11 is a bar graph of the payout versus reactor residence time.

One of the design variables is the residence time of the system. This controls the amount of energy that can be recovered from the waste, but requires larger systems and higher capital for longer residence times. Also shorter residence times require more operating attention by the user. FIG. 11 shows that while there is not much difference in the profitability for various residence times, a 6-day residence time is the best choice.

Figure 12:
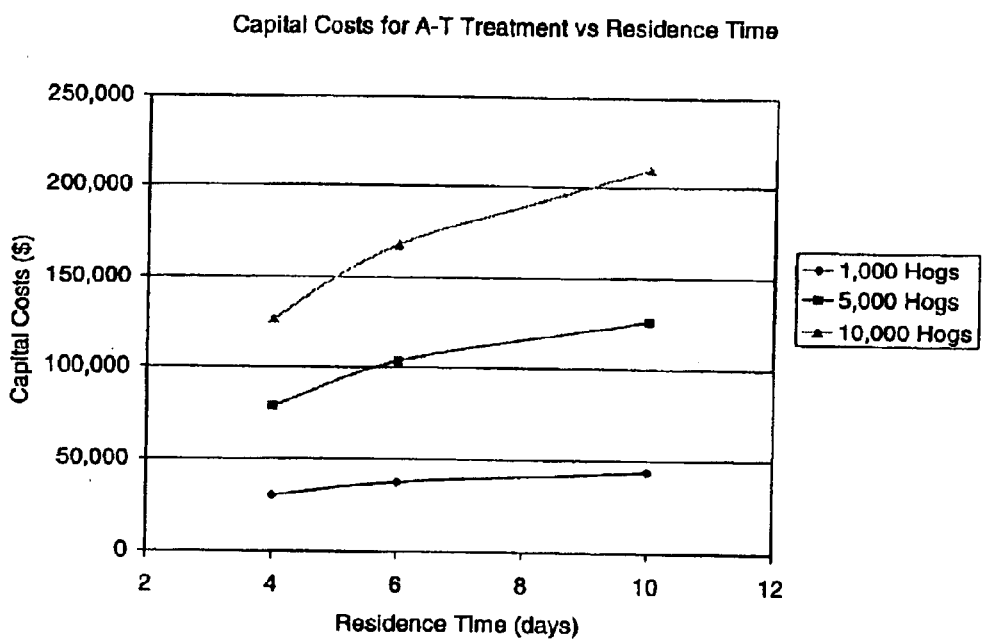
FIG. 12 is a graph of capital costs versus reactor residence time.
Figure 13:
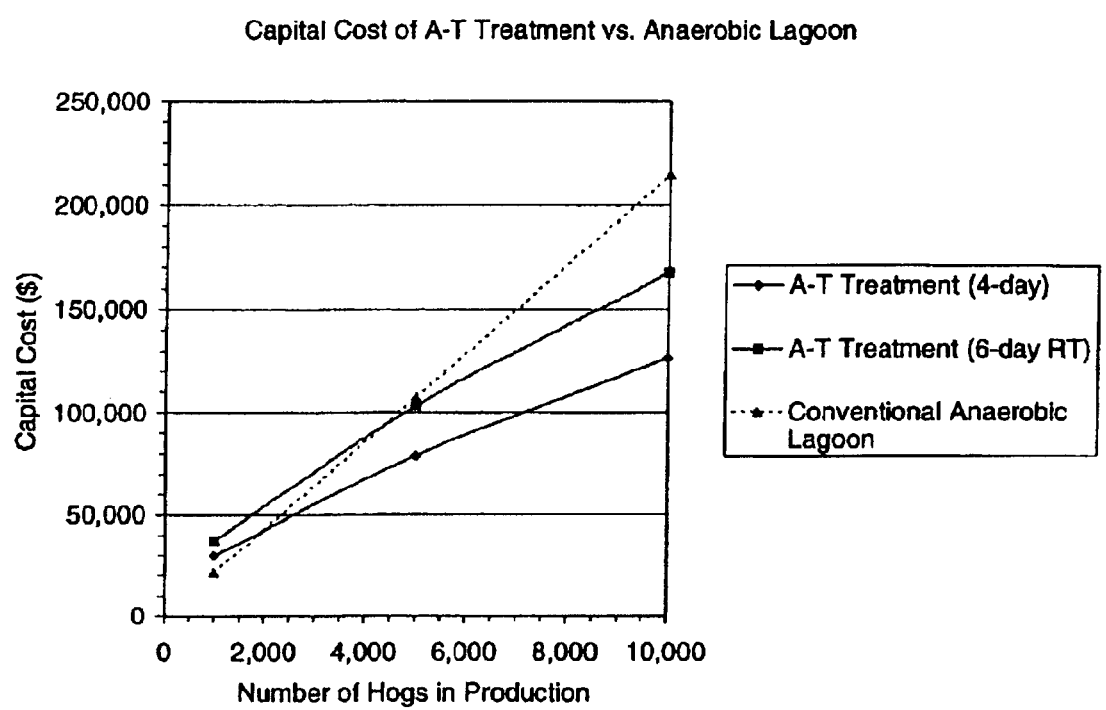
FIG. 13 is a graph of capital costs for an A-T treatment system versus an anaerobic lagoon.

Residence times have a strong effect on capital costs. This is seen in FIG. 12 for various farm sizes. The capital costs for A-T treatment are very competitive with the costs for construction of anaerobic lagoons. FIG. 12, presents the estimated capital cost of A-T Treatment for the 4-day and 6-day residence times with that estimated for an unlined anaerobic lagoon for 180-day storage. Both A-T cases are lower than anaerobic lagoon storage for medium-large size farms, but the 4-day case is significantly less costly than conventional treatment.

The method and system of the present invention could also be implemented as a continuous, rather than batch, process. In this system, heat from the treated waste leaving the system is recovered using a regenerative heat exchanger. Waste is continuously fed to the reactor and exchanges heat with reactor effluent removed from the system. Higher levels of air recycling (up to 80%) reduce heat lost from water evaporation in the system while maximizing the oxygen utilized in the air stream. The system cover 32 can be insulated with the equivalent of 0.1 m of fiberglass insulation.

Initially the reactor pit 22 is loaded with hog waste, air is added from the blower system that recycles some of the air from the reactor. A mixer 30 can be provided to help maximize oxygen transfer, but may not be needed in all systems. After the system has heated up to operating conditions (approximately 55° C.), which may be accomplished with an auxiliary heater, waste is continuously fed to the reactor pit 22 through the regenerative heat exchanger where the treated waste product that overflows from the reactor pit gives up some of its heat to the incoming waste. After the initial heating, the system is not only auto thermal, but also produces excess heat in the form of heated water at temperatures in the range of the operating temperature (approximately 55° C.).

The air not recycled is passed through the ammonia scrubber 36 to recover ammonia as a high-grade fertilizer as ammonium sulfate solutions. Alternatively, it is possible to make ammonium phosphate or other valuable fertilizer solutions. This may be either saved for special use, or mixed with the finished treated product to restore its nitrogen level. Clean, low odor air is emitted from the scrubber 36 to the atmosphere.

Heat must be removed from the reactor to maintain the optimum temperature of approximately 55° C. so that the action of the thermophilic bacteria is maximized. The heat exchanger of the heat recovery system 40 passes water through the reactor pit 22 that can be used for various purposes. For example the resulting hot water can be used for heating farrowing or nursery buildings or in heating aquaculture tanks or greenhouses.

The energy could also be used to dry the residual solids from the process(which are about 30% of the original amount of solids), and these dried solids may be used as field fertilizer in the non-growing season, a high value organic food fertilizer, and/or dry solids for co-firing in electric power stations. In the warm months, heat produced can be used as an aid in building ventilation, reducing electric power consumption and power for state-of-the-art refrigeration/chilling systems for cooling production buildings.

The base design for the continuous system assumes a continuous flow of waste from 10,000 hogs at initial total solids concentration of 15–80 g/L. This is based on a per capita waste solids generation rate of 0.72 kg/day of dry solids, and an average hog size of 65 kg. An energy content of raw waste of 15,300 kJ/kg dry solids was measured. The waste generation rate is a diluted value based on some water introduction from other sources. A constant level of solids production per animal was assumed as reported in agricultural engineering standards (ASAE, 1995).

The energy balance on the system may be calculated given several assumptions: the heat production kinetics is equivalent to the highest rate found in the lab, the average air temperature is 10° C., the average wind speed is 1.34 m/s, the thermal conductivity of the soil is 1.7 W/mK, and the soil temperature is 17° C. Simplifying assumptions as to the reactor shape were made for the heat transfer calculations, for example the heat loss to soil was made assuming the shape was a hemisphere with the same surface area as the cylinder used in other calculations. A 2-D shape factor is available for this conduction calculation. Also, heat transfer to the air by convection through the reactor cover was assumed to follow that of a flat plate of twice the reactor surface area. Of course heat transfers may be calculated using finite element methods after a detailed design is made and shapes of the reactor and cover are known.

Figure 14:
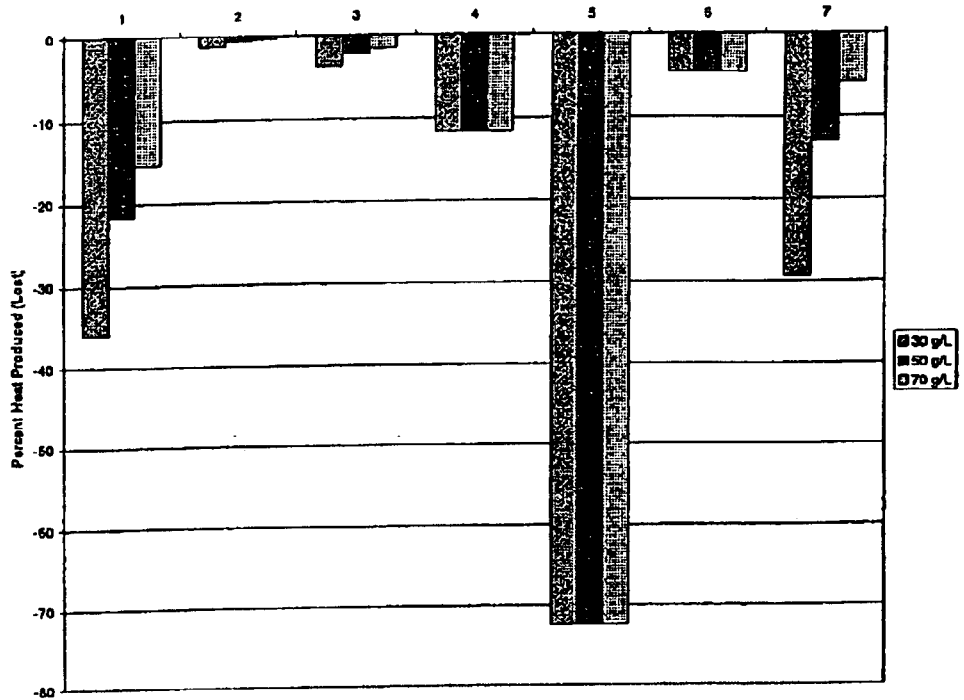
FIG. 14 is a chart of heat flows (losses) from a continuous insulated system with no air recycle as a function of waste concentration and as a percentage of total heat produced, (where 1=heat up feed waste, 2=heat lost to ground, 3=heat lost through air cover, 4=heat lost to heat feed air, 5=heat lost in water evaporation, 6=heat lost to heat makeup water, and 7=additional heat required for operation)
Figure 15:
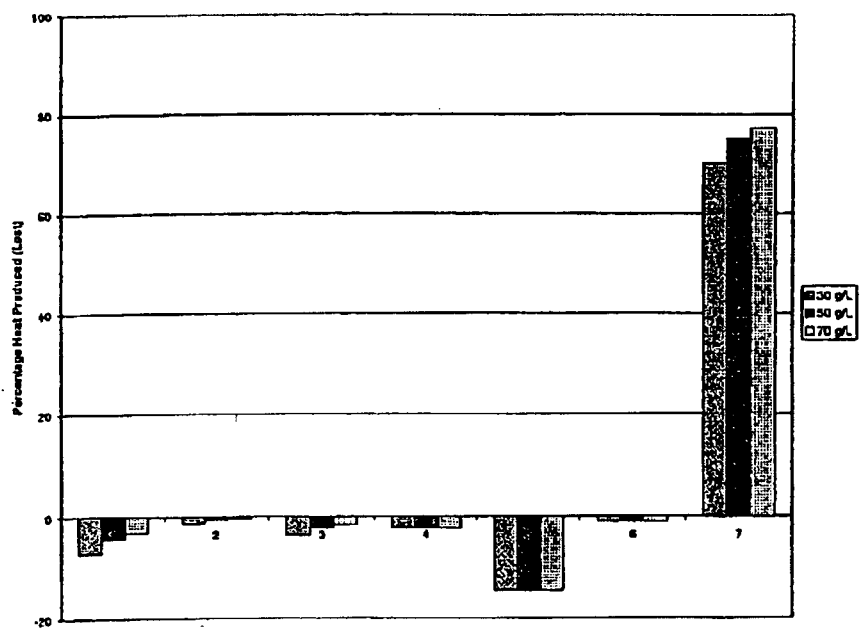
FIG. 15 is a chart or heat flows (losses) continuous insulated system with maximal air recycle and regeneration as a function of waste concentration and as a percentage of total heat produced, (where I=heat up feed waste with regeneration heat exchanger, 2=heat lost to ground, 3=heat lost through air cover, 4=heat lost to heat feed air, 5=heat lost to water evaporation, 6=heat lost to heat makeup water, 7=net heat produced)

With these assumptions, the heat losses (and net production may be found in FIGS. 14 and 15. FIG. 14 shows the percent heat losses based on the total heat produced by biooxidation for a continuous insulated system with no air recycle. Since insufficient heat is produced to overcome the losses, a hypothetical heat addition rate is also shown to balance the system. Similarly, FIG. 15 shows the heat losses for a continuous insulated system with heat regeneration and air recycle. Also shown in FIG. 15 is the net heat produced from the system as hot water. Significant heat is produced in this system as compared to the system results shown in FIG. 14 where more heat is lost than is produced.

Figure 16:
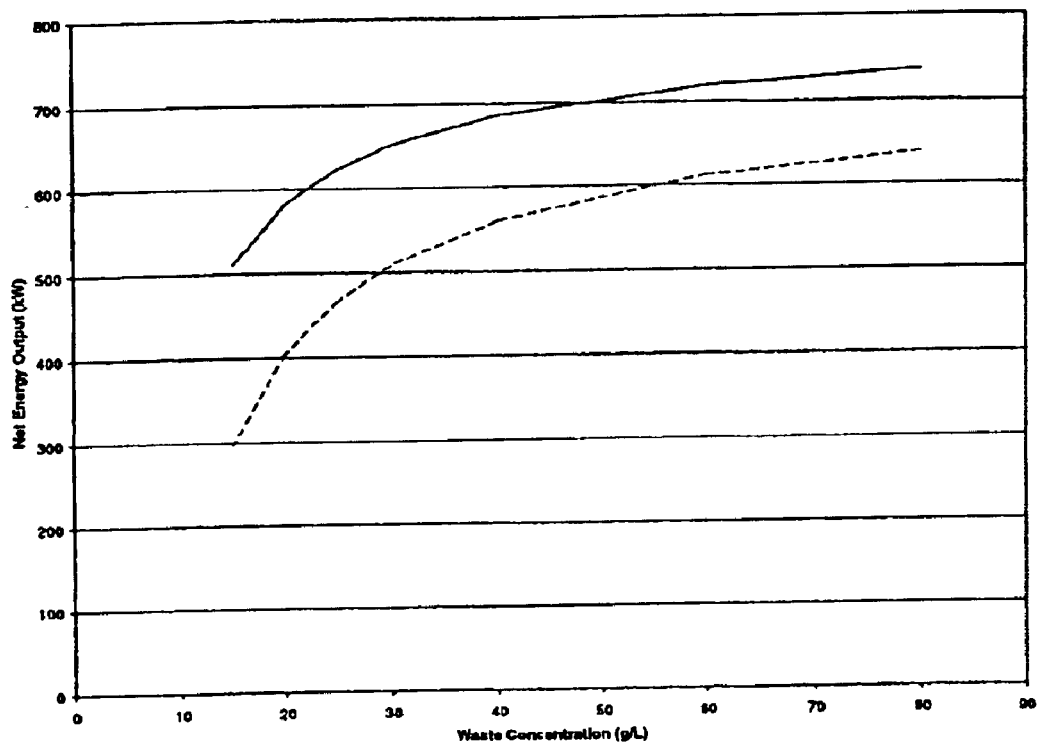
FIG. 16 is a graph of useable and net energy output from a continuous A-T system, in which the solid line is the total usable heat output as hot water, and the dashed line is the net energy output considering process power usage.

While the energy produced shown in FIG. 15 is available for use, it is not the net energy production in the system. Energy is needed to power the mixer, air blower and several pumps. The net energy produced is shown in FIG. 16.

The A-T system of the present results in net heat production, although to benefit from this heat production there must be some need for hot water. For swine producers, heat is needed for building heating in a number of cases. Farrowing and nursery operations require heating in the cold months. This, of course, depends strongly on the location and climate where the farm is found. However, finishing (grower) operations generally are not heated. Sometimes, some nursery (weaning) operations occur at the finishing location. Most of the waste is produced in finishing operations and the current philosophy often leads to finishing operations located at a distance from the farrowing operations. The impact of these factors is that heating the farrowing building with aerobic thermophilic-produced heat is nearly always possible, but unless finishing operations are close, this process might not supply all of the needed heat. Wean-to-finish operations may make use of the heat for the growing cycle when the pigs are young, but the heat may not be needed during later stages of growth.

Alternative uses of the heat produced during the cold months at a finishing operation include heating greenhouse or aquaculture operations. In each case, additional profit arises from the operation and increases overall pork production profitability.

This process oxidizes up to 70% of the initial solids in the swine waste. These remaining solids may have value added by the aerobic thermophilic process. In particular, this process removes high levels of pathogens and may be effective in removing antibiotics added in pork production., thus the residual solids may be marketable as a high-grade organic food fertilizer or an animal food supplement. Production of this product would be applicable to all type of pork producers during a portion or all of the calendar year. In this case, heat produced could be used to dry the solids for commercial sale. Even where the process is not effective in pathogen or antibiotic removal, the solids may still be of interest for use in co-firing utility boilers to recover energy value.

At locations where the heat is being used for cold month heating and solids are not being dried, there are numerous other uses, including use of the heat to warm air drawn into a chimney to increase the draught of the chimney and reduce electrical power used for building ventilation while improving dispersion of air emissions (odor) and lowering downwind concentrations, and advanced types of air conditioning, which are powered by hot water at 60° C., have been reported and are commercial in Japan. Pork producers could well use free air conditioning during the warm weather months to reduce mortality and improve production efficiencies if the economics of purchasing and operating the equipment are favorable.

Figure 17:
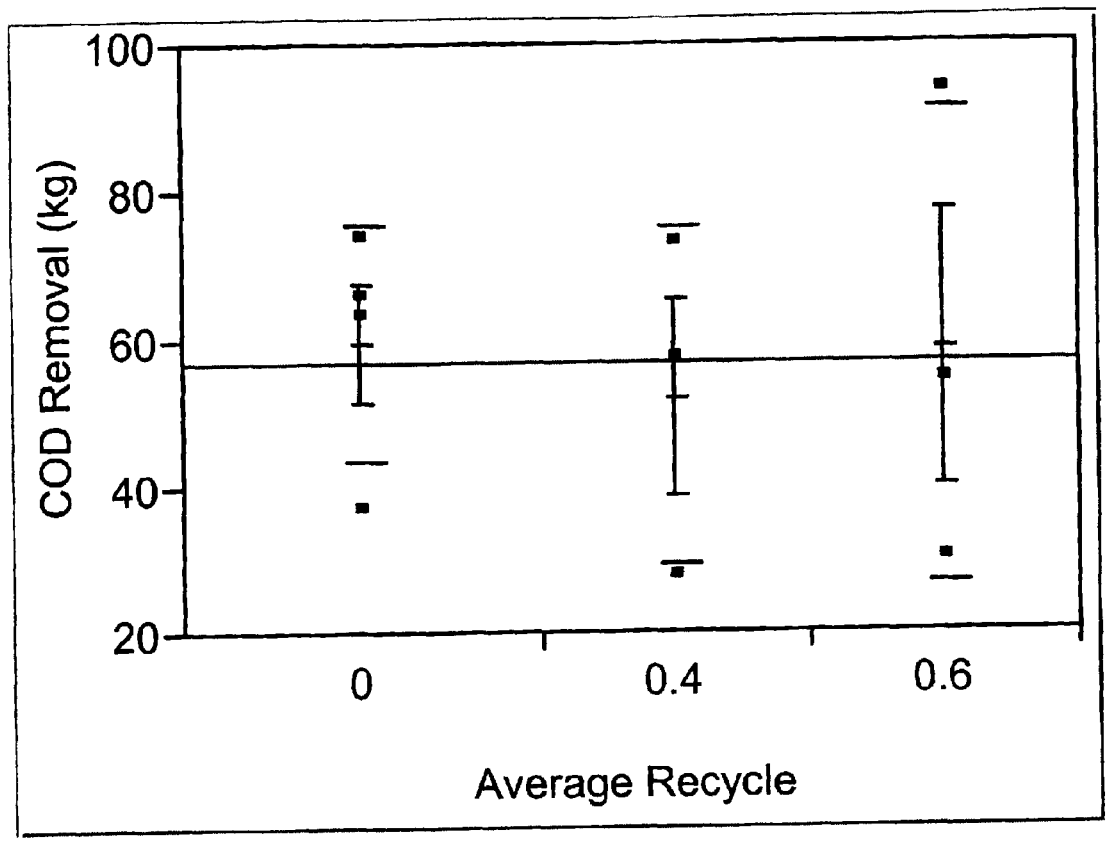
FIG. 17 is a graph of COD removal for multiple runs at each of three different levels of air recycling: (1) 100% fresh air, i.e., no recycling of air; (2) 60% fresh air, i.e. 40% recycling; and (3) 40% fresh air, i.e., 60% recycling.

Multiple experiments were run for three different levels of air recycling: (1) 100% fresh air, i.e., no recycling of air; (2) 60% fresh air, i.e. 40% recycling; and (3) 40% fresh air, i.e., 60% recycling. FIG. 17 is a graph of the removal of the following table of data of COD removal from the system under each of three conditions:

| Level | Number | Mean | Std Dev | Std Err Mean | Lower 95% | Upper 95% |
|---|---|---|---|---|---|---|
| 0 | 4 | 59.7202 | 15.9928 | 7.996 | 40.812 | 78.63 |
| 0.4 | 3 | 52.3346 | 22.9497 | 13.250 | 21.003 | 83.67 |
| 0.6 | 3 | 58.8518 | 32.0135 | 18.483 | 15.146 | 102.56 |

COD removal has been shown to be proportional to the amount of heat biologically produced. Removal of 1 kg of COD is equal to the liberation of 13.9 MJ of heat. On average (each run had different level of solids present) the zero recycle runs produced a total of 1.6 kW of heat, while the 40% recycle runs averaged 1.4 kW and the 60% recycle runs averaged 1.6 kW of heat. At a confidence level of 95%, there is no statistical difference between these recycle rates and since the heat lost in the exhaust air is proportionally reduced, increased recycle leads to considerably more recovered heat useful for heating buildings, etc. FIG. 17 thus shows that, surprisingly, there is essentially no difference in the removal of COD, i.e., the liberation of heat, with or without recycling. Because the recycling reduces the loss of heat generated, recycling improves the ability to recover useful heat from the system, without impairing its generation. The inventor believes that as much as 80% of the air cycled through the reactor can be recirculated, dramatically reducing heat loss, and improving the ability to recover useful heat from the system.

What is claimed is:

1. A method for the aerobic thermophilic treatment of organic matter comprising passing air through organic matter in a closed reactor, recycling a portion of the air that has passed through the organic matter back through the organic matter in the reactor, removing ammonia from remaining air that has passed through the organic matter and releasing it from the reactor; and circulating a fluid through the reactor to remove heat therefrom, and using the heat to dry treated organic matter removed from the reactor.

2. A system for the aerobic thermophilic treatment of organic material, the system comprising a reactor for containing the organic material; an aeration system for passing air through the organic material contained in the reactor, and a recirculation system for capturing at least a portion of the air that has passed through the organic material, the recirculation system including a blower located outside of the reactor; and recycling it to the aeration system; and a system for removing ammonia from the air that has passed through the organic material before releasing it to the atmosphere.

* * * * *